(No Model.) 3 Sheets—Sheet 1.
C. PARHAM.
CAR SEAT LOCK.
No. 367,057. Patented July 26, 1887.
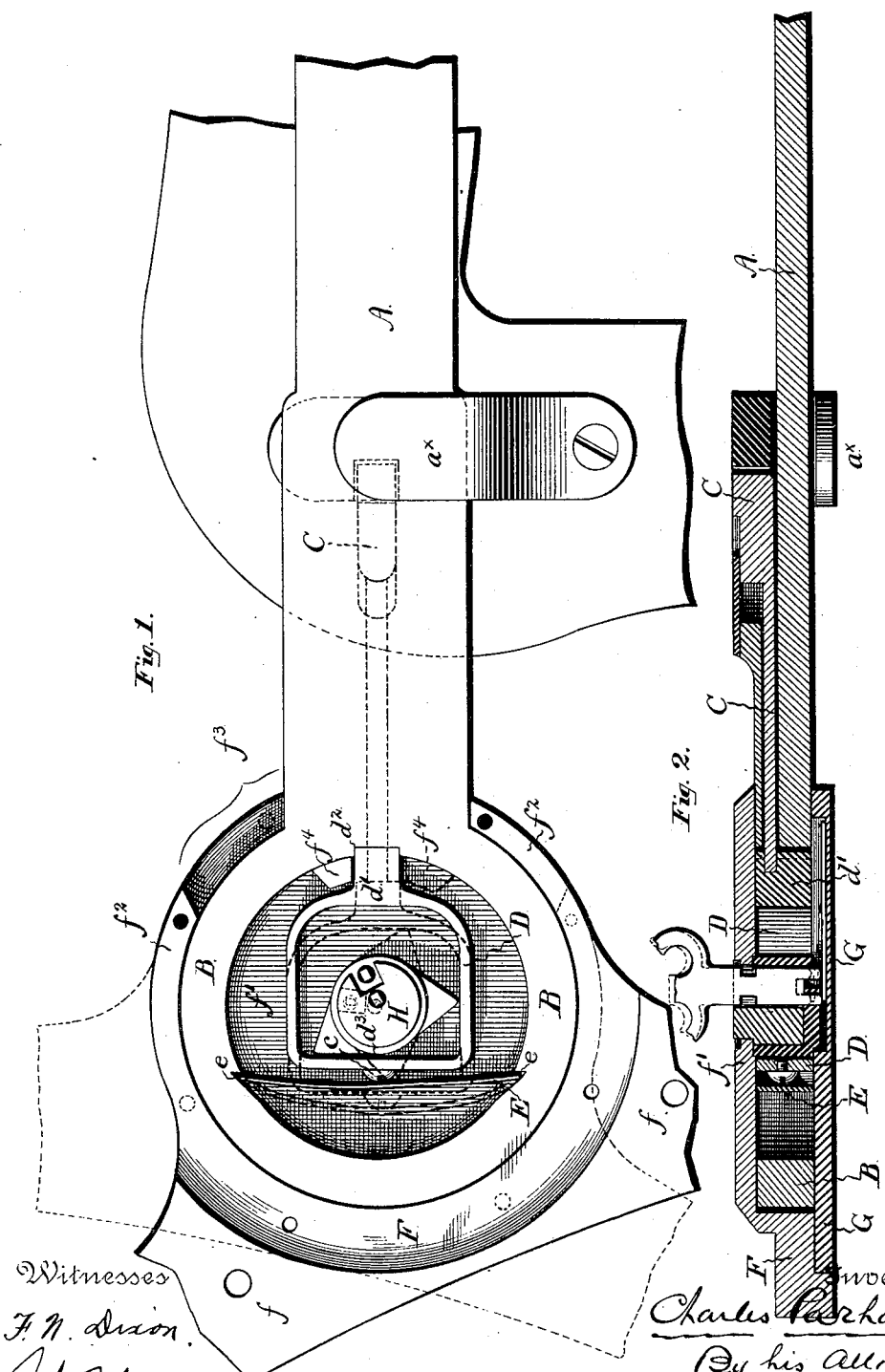

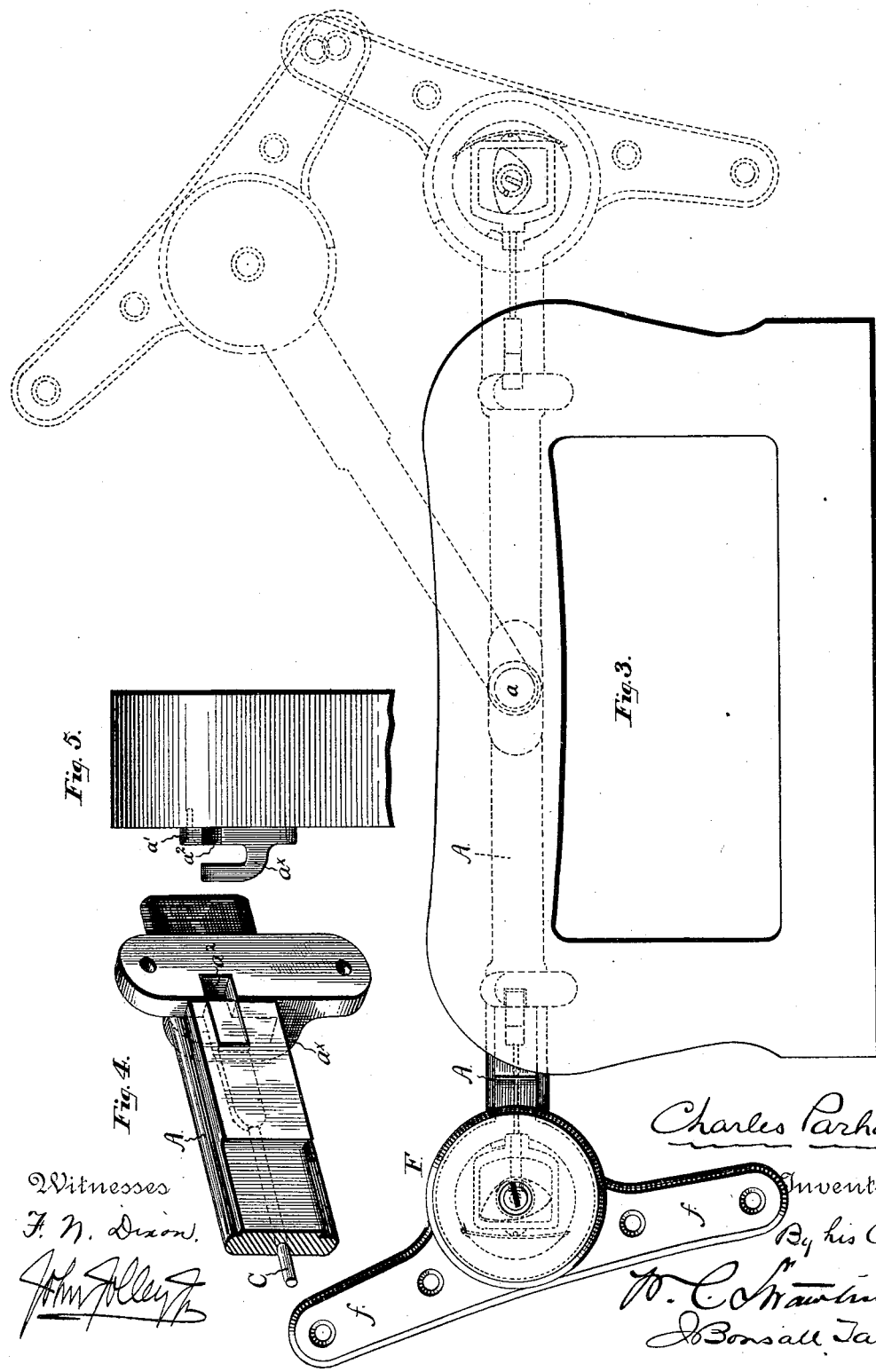

(No Model.) 3 Sheets—Sheet 3.
C. PARHAM.
CAR SEAT LOCK.
No. 367,057. Patented July 26, 1887.
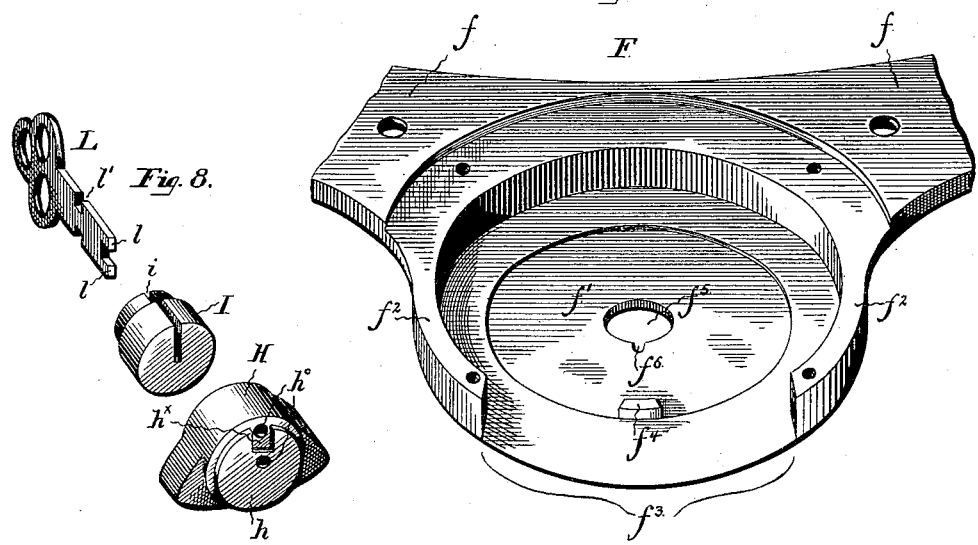
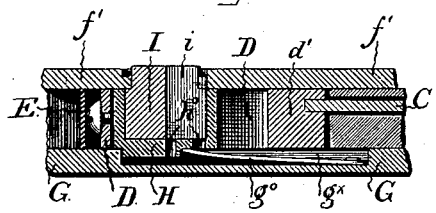
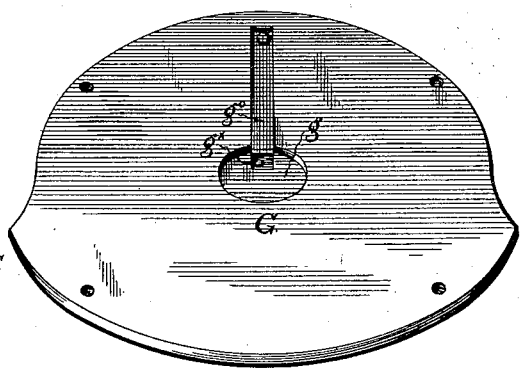
Witnesses
F. Norman Dixon.
Charles Parham,
Inventor
By his Attorneys,

UNITED STATES PATENT OFFICE.

CHARLES PARHAM, OF PHILADELPHIA, PENNSYLVANIA.

CAR-SEAT LOCK.

SPECIFICATION forming part of Letters Patent No. 367,057, dated July 26, 1887.

Application filed May 20, 1887. Serial No. 238,930. (No model.)

*To all whom it may concern:*

Be it known that I, CHARLES PARHAM, a citizen of the United States, residing in the City and County of Philadelphia, and State of Pennsylvania, have invented an Improvement in Car Seat Locks, of which the following is a specification.

My invention relates generally to such car seats as are constructed with shifting or reversible backs, and particularly to the mechanism by which the said backs are attached to the frame-work of the seats and by virtue of which they are constituted reversible or capable of transposition from one side of the seat to the other.

The object of my invention is the provision, in connection with the back-arms of a car seat, upon and by which arms the back is so mounted as to be capable of two adjustments or movements, namely, first, a movement bodily from one side of the seat to the other; and, second, a limited tilting movement upon and with reference to the arms themselves,—of a compact positively operated locking device by which such back may be locked in position and held fixedly from movement in either of its said adjustments,—and by which also, at a single manipulation of the operating key, it will be unlocked and made free for adjustment in both respects.

In the accompanying drawings, Figure 1 is a view in side elevation of the operative parts of my invention, the plate G being removed,— the bolt and bolt slot being shown in dotted lines,—and two positions of the back plate being shown by full and dotted lines respectively. Fig. 2 is a sectional view of the parts represented in Fig. 1. Fig. 3 is a view in side elevation of my improvement, applied to the end frame of the car seat, different adjustments being shown therein in dotted lines. Fig. 4 is a perspective fragmentary detail view of the back arm, applied bolt, and bracket. Fig. 5 is a detail elevation of the bracket, applicable to the end frame-work of the seat. Fig. 6 is a perspective view of the back casting. Fig. 7 is a perspective view of the inner face of the plate G. Fig. 8 is a perspective view of the key, key block, and cam. Fig. 9 is a fragmentary sectional view of the parts shown in Fig. 2,—the key being removed.

Similar letters of reference indicate corresponding parts.

In the drawings, A is the back-arm of a car seat back, pivoted or secured to the end frame-work of the seat in any ordinary manner, as by the pivot bolt $a$ represented. The outer or free end of this arm is formed into a skeleton disk or ring B.

Brackets, designated in the drawings by $a^x$, are secured to the end frame-work of the seat, one on either side of the pivot bolt $a$, and in suitable position to support the arm A which is taken into that bracket which is on the side of the seat upon which the back at the time happens to be. The upper outer edge of each bracket is rounded or beveled as shown at $a'$, and each bracket is provided with a bolt slot or seat, $a^2$.

C is a bolt mounted upon and carried by the arm A, located upon that side thereof which faces the seat frame-work to which said arm is attached, and adapted to be moved end for end in its slide bearings.

D is what I term the bolt collar, of the form represented in the drawings, located within the skeleton disk B, and mounted upon or connected with the outer end or shank of the bolt C.

In the construction of my invention it is desirable that the bolt and bolt collar should always be resiliently held in to their utmost limit toward the bolt slot. I find it convenient to so hold them by means of the spring plate E, held in niches $e\ e$ formed in the skeleton disk, and in proper position to bear against the outer end of the bolt collar. I provide the outer end of the bolt collar with a small bearing stud $c$, against which the plate E may bear. When the arm A, therefore, is, in the shifting of the back, brought into one of its brackets $a^x$, the end of the bolt C will impinge against the beveled surface $a'$, and the stress of the spring plate E be overcome; and when said bolt arrives at a point opposite to the bolt seat $a^2$, it will, by said spring, be shot there into, and the back be thereby locked in position.

F is a back-plate, formed of metal, and attached by suitable arms $f$ to the back. This plate has a discular member, $f'$, provided with a wall, $f^2$, at a right angle to its plane, and extending around said discular member for about three quarters of its circumference, the region of the discular member in which the wall opening, which I designate $f^3$, is thus left, being that farthest from the arms $f$. This back plate is proportioned to fit upon and around the skeleton disk B and form therewith a hinge joint, and its wall opening is provided to permit of the necessary throw of the arm A, incident to the adjustment of the back in respect to the seat, when the back is shifted from one side of the seat to the other. The back plate is, when not locked, capable of a rocking, or rotatively sliding movement upon the skeleton disk, which constitutes them together a hinge joint as stated,—the extent of their hinge movement is, however, limited and determined by the length of the wall opening $f^3$.

G is a plate adapted to be secured upon the top of the wall $f^2$ of the back plate F, and maintain in proper relationship to each other the parts of the hinge joint above described as well as other devices which will be hereinafter referred to.

Upon the inner flat face of the discular part $f'$ of the back plate is a projection or stud $f^4$, located opposite the center of the wall opening $f^3$ and at such point that when said back plate is in place upon the skeleton disk B said stud $f^4$ lies within the circumference of the same.

The bolt collar D has a stop block $d'$, to which, incidentally, the bolt C is attached, and, in the inner circumference of the ring B is a shallow seat $d^2$ in which the said stop block, under the stress of the spring plate E acting against the bolt collar D, is seated.

The operation of the devices already described is as follows: The back, when in position, forms an obtuse angle with the plane of the surface of the seat. When the back is shifted to the other side of the seat it should be readjusted in respect to the plane of the seat, so as to, in its changed position, be at an obtuse angle therewith. Through the instrumentality of the devices described, the back is locked rigidly in either of its adjusted positions with respect to the back arm, that is, it is prevented from moving in one direction by the end of the wall $f^2$ in contact therewith, and is prevented from tilting in the other direction by the stud $f^4$. The back-arm, in respect to the seat, is locked in position by the bolt C which, as stated, engages in the slot $a^2$ of the carrier bracket $a^x$. To shift the back from one side of the seat to the other, and also to alter the adjustment of the back and back arm with reference to each other, the bolt collar must be retracted, and the stress of the spring plate E be overcome, whereby the bolt C is withdrawn from the slot $a^2$, and the stop block $d'$ withdrawn from contact with the stud $f^4$. The back is then tilted until the other end of the wall $f^2$ comes into contact with the edge of the back arm, whereupon the bolt collar is released, and the stop block re-enters its seat $d^2$ now at the opposite side of the stud $f^4$,—the hinge joint members are thus locked in their new position. The back is then thrown to the other side of the seat, its bolt deflected by the beveled surface $a'$ of the metal bracket $a^x$ and by the spring plate E sprung into the slot $a^2$. This retraction of the bolt collar, which in the mounting of the parts is housed between the members of the hinge joint, is effected through the instrumentality of the following device: Within the said collar, and in juxtaposition to that face of the same which I designate $d^3$ and term the acting face, is mounted a cam H having two wings or crests. One end of the cam is cylindrical, and forms an arbor or axle $h$, which, when the plate G is in position, is entered into a suitable bearing or seat $g$ in the inner face thereof. In the end of the arbor $h$ is formed a small square edged recess $h^x$. The body of the cam H is cylindrically hollow. The lower or inner end of the shell or body of the cam is pierced by two small orifices $h^\circ$, on the same radial line, one of which orifices opens exteriorly into the recess $h^x$. In the inner face of the plate G is formed a narrow channel or groove, $g^x$, one end of said groove extending into and lying within the seat $g$. Within, and of about the same length as, the channel $g^x$ is fitted a spring plate $g^\circ$, one end of which, thus brought within the seat $g$, is turned outward so as, when the arbor is seated in a certain position in its bearing, to engage with the recess $h^x$ of the arbor $h$ of the cam H.

Accurately fitting into, filling, and projecting above the said hollow interior of the cam H, is what I term a key block I, having a key slot $i$ through the same from end to end and extending to its circumference. The outer end of said key block is of smaller diameter than its body, and extends, when the parts are in position, through an orifice, $f^5$, in the discular member of the back plate, and, together with the arbor $h$, swivels and supports said cam and key block. The said orifice $f^5$ is circular, with a key niche $f^6$ in its margin. When the key block is turned or rotated so that its key slot is in registry with said key niche the introduction of the operating key is permitted. When the spring plate $g^\circ$ is engaged in the recess $h^x$ the cam is, according to my arrangement of the parts, held securely against manipulation or turning. In order to turn the cam to bring one of its wings against the acting face of, and to retract, the bolt collar, it is necessary to press the spring plate $g^\circ$ down out of the recess $h^x$ and into its own groove or channel $g^x$. To effect this depression and the operative rotation of the cam, I employ a key L, of substantially the outline represented in the drawings,—the operation of which is as follows:—The key slot of the key block, when the latter is rotated to bring the slot into its position of registry with the niche $f^6$ in the orifice $f^5$, is in position directly over, and leads the key, when entered therein, directly to the two orifices $h^\circ$ in the base of the cam. The key is provided with two end prongs $l\,l$ which enter said orifices $h^\circ$, the outer prong encountering, and, in its longitudinal thrust, depressing out of the recess $h^\times$ the spring plate $g°$. The cam is then free to be rotated, and the key, (the side of which is provided with a slot $l'$ which takes in the edge of the plate surrounding the orifice $f^5$,)—by the engagement of its prongs with the orifices $h°$, being rotated, rotates said cam.

Having thus described my invention, I claim:—

1. In combination with the arms of a car seat, a back, back-arms, each, at one end, pivoted to the respective seat arms, and, at the other end, connected by a hinge joint with the back or with an attachment thereto, a locking device attached to one of said back arms and adapted to be operated to lock said back arm with the seat arm or with an attachment thereto, as specified.

2. In combination with the arms of a car seat, a back, back-arms, each, at one end, pivoted to the respective seat arms, and, at the other end, connected by a hinge joint with the back or with an attachment thereto, a locking device attached to one of said back-arms and adapted to be operated to lock said back arm with the seat arm or with an attachment thereto, and to simultaneously lock said back arm, with the back, as specified.

3. In combination with the arms of a car seat, a back, back-arms, each, at one end, pivoted to the respective seat arms, and, at the other end, connected by a hinge joint with the back or with an attachment thereto, a locking device attached to one of said back arms and adapted to be operated to lock said back arm with the seat arm and lock said back arm with the back, and adapted to be operated to simultaneously unlock said parts, as specified.

4. In combination with the arms of a car seat, a back, back-arms, each, at one end, pivoted to the middle of the respective seat arms, and, at the other end, connected by a hinge joint with the back or with an attachment thereto, and adapted to be operated to swing said back to either before or behind said seat, a locking device attached to one of said back arms and adapted to automatically operate to simultaneously lock said back-arm with the back or with an attachment thereto, and to lock said back-arm with the seat or with an attachment thereto, and adapted to be operated to simultaneously unlock said devices, and permit said back arm to be thrown to swing the back to the other side of the seat, and to permit the back to be angularly adjusted in respect to the back arm, as specified.

5. In combination with a car seat, a reversible back, a back-arm upon which said back is mounted, a bracket attached to the seat frame for supporting said back-arm, a stop attached to the back,—a connected bolt and stop-block mounted upon said back-arm and controlled by a spring, said bolt being adapted to be entered in a slot in said bracket, and said stop block being adapted to be engaged against said stop, substantially as set forth.

6. In a car seat, a reversible back mounted upon arms adjustable with reference to the back to the seat, in combination with a spring-controlled locking device adapted to effect the locking together of the back-arm and back and back-arm and seat arm, in both said adjustments, and the unlocking of the same at a single operation,—a bolt collar attached to said locking device, and a cam adapted to operate against the inner face of said collar and unlock said lock, substantially as set forth.

7. In a car seat, a reversible back mounted upon back-arms, and adjustable with reference thereto, and in combination with a spring-controlled locking device adapted to effect the locking together of the back-arm and back and back-arm and seat arm, in both said adjustments, or the unlocking of the same, at a single operation,—a bolt-collar attached to said locking device, a cam adapted to operate against the inner face of said collar and unlock the said lock, and a spring adapted to engage in a recess in said cam, substantially as set forth.

8. In a device of the class hereinbefore recited, as a means for operating the sliding bolt-collar,—a hollow cam provided with a recess in its base, a spring plate, a key block filling said hollow cam and provided with a key slot, entrance to or exit from which by the key may be effected only when the key slot of the key block is in registry with a slot in the margin of the orifice of the casing in which the same is mounted, and when said key slot is directly over the key orifice in the cam, as specified.

In testimony whereof I have hereunto signed my name this 5th day of May, A. D. 1887.

CHAS. PARHAM.

In presence of—
WM. C. STRAWBRIDGE,
J. BONSALL TAYLOR.